US008681673B2

(12) United States Patent
Lee et al.

(10) Patent No.: US 8,681,673 B2
(45) Date of Patent: Mar. 25, 2014

(54) METHOD FOR REDUCING POWER CONSUMPTION IN WIRELESS COMMUNICATION SYSTEM

(75) Inventors: Yu-Ro Lee, Daejeon (KR); Jong-Ee Oh, Daejeon (KR); Sok-Kyu Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 268 days.

(21) Appl. No.: 13/081,930

(22) Filed: Apr. 7, 2011

(65) Prior Publication Data

US 2011/0280168 A1 Nov. 17, 2011

(30) Foreign Application Priority Data

Apr. 7, 2010 (KR) ........................ 10-2010-0031893

(51) Int. Cl.
*H04W 52/02* (2009.01)

(52) U.S. Cl.
USPC ........................................... 370/311; 713/151

(58) Field of Classification Search
USPC ......................................... 370/311, 328–329
See application file for complete search history.

(56) References Cited

U.S. PATENT DOCUMENTS

| | | | | |
|---|---|---|---|---|
| 2002/0138721 | A1* | 9/2002 | Kwon et al. | 713/151 |
| 2007/0121946 | A1* | 5/2007 | Ito et al. | 380/270 |

* cited by examiner

*Primary Examiner* — Hassan Kizou
*Assistant Examiner* — Tejis Daya

(57) ABSTRACT

A method for reducing power consumption in a wireless communication system includes: generating a descramble initial value by using at least some bits of identification information of an STA, which is known to an AP or base station and the STA; generating a first descramble sequence by using the generated descramble initial value and comparing at least some bits of the generated first descramble sequence with at least some bits of a service field of a currently-received signal; as the comparison result, when it is determined that the destination of the currently-received signal is not set to the STA, stopping the signal reception; and as the comparison result, when it is determined that the destination of the currently-received signal is set to the STA, generating a second descramble sequence by using the descramble initial value and descrambling the currently-received signal.

20 Claims, 8 Drawing Sheets

AP transmits information which every STA should know, such as beacon, by using random scramble initial value — S701

STA estimates scramble initial value by using service field and receives information transmitted from AP — S702

Exchange information required for transmitting data between AP and STAs — S703

S704 Information required for data transmission is successfully exchanged? — No (to S702) / Yes AP scrambles and transmits data by using ID of STA — S705

STA generates descramble sequence by using ID of STA, and compares descramble sequence with received signal of service field — S706

S707 Destination of currently-received signal is set to STA? — Yes / No

Continue data reception — S708

Terminates data reception — S709

METHOD FOR REDUCING POWER CONSUMPTION IN WIRELESS COMMUNICATION SYSTEM

CROSS-REFERENCE TO RELATED APPLICATIONS

The present application claims priority of Korean Patent Application No. 10-2010-0031893, filed on Apr. 7, 2010, which is incorporated herein by reference in its entirety.

BACKGROUND OF THE INVENTION

1. Field of the Invention

Exemplary embodiments of the present invention relate to a method for reducing power consumption in a wireless communication system; and, more particularly, to a method capable of reducing power consumption of a station (STA) by quickly determining whether or not to receive a signal which is being received, through a service field existing at the front of a data region, in a wireless communication system.

2. Description of Related Art

In general, a wireless communication system such as a wireless LAN (WLAN) system includes a plurality of access points (AP) which are connected to one another through a network. A plurality of STAs existing within a basic service set (BSS) managed by one AP simultaneously transmit/receive frames to and from the AP. Meanwhile, an independent BSS (IBSS) includes a plurality of STAs, and one STA transmits/receives frames at the same time as the other STAs.

The frame transmission process in such a wireless communication system will be described as follows.

The AP transmits information which is required by a plurality of STAs to transmit sounding/feedback or receive data, through a control frame. When sounding/feedback is required, the STAs perform sounding/feedback to the AP. The AP transmits data by using the information from the STAs. The STAs receiving the data transmit information on whether or not an error occurred in the received data to the AP.

FIGS. 1A to 1C show the formats of protocol data units defined in the IEEE 802.11 related to the WLAN system. FIG. 1A shows the format of a PPDU (PLCP (Physical Layer Convergence Procedure) Protocol Data Unit) of the IEEE 802.11a/g for legacy STAs. FIG. 1B shows the format of a PPDU, which is defined in the IEEE 802.11a, in a HT (High Throughput) mixed environment in which legacy STAs and HT STAs are mixed. FIG. 1C shows the format of a PPDU, which is defined in the IEEE 802.11ac, in a VHT (Very High Throughput) mixed environment in which legacy STAs, HT STAs, and VHT STAs are mixed.

Referring to FIGS. 1A to 1C, the PPDU format for legacy STAs includes a legacy short training field L-STF, a legacy long training field L-LTF, a legacy signal field L-SIG, a service field, and a data field DATA.

Referring to FIGS. 1A to 1C, the PPDU format in the HT mixed environment in which legacy STAs and HT STAs are mixed includes legacy training fields L-STF and L-LTF, a legacy signal field L-SIG, a HT signal field HT-SIG, HT training fields HT-STF and HT-LTF, a service field, and a data field DATA.

Recently, in the IEEE 802.11 TGac, standardization has been discussed on a VHT wireless system capable of providing a maximum transmission rate of 1 Gbps at a MAC SAP (Service Access Point). In order to maintain frequency efficiency while satisfying such a high transmission rate, an AP and a STA should support a larger number of streams than four streams supported in the IEEE 802.11n. Therefore, a large number of antennas are required.

Considering the complexity or power consumption of the STA, it is difficult for the STA to support a large number of antennas. Accordingly, multi-user MIMO technology in which an AP transmits data to a plurality of STAs at the same time is being considered. In the VHT WLAN system, the multi-user MIMO technology is applied to consider the PPDU format as shown in FIG. 1C.

Referring to FIG. 1C, the PPDU format for VHT STAs includes legacy training fields L-STF and L-LTF, a legacy signal field L-SIG, a VHT signal field VHT-SIG-D which may be decoded by all STAs, VHT training fields VHT-STF and VHT-LTF, a VHT signal field VHT-SIG-D which may be decoded only by a VHT STA, a service field, and a data field DATA.

In the PPDU format for VHT STAs, information for demodulating the data field DATA is transmitted through the fields L-SIG, HT-SIG, VHT-SIG-C and VHT-SIG-D. Each of the fields L-SIG, HT-SIG, VHT-SIG-C and VHT-SIG-D has a limited size, because a preset number of bits are transmitted by using a predetermined modulation method and a channel code rate. Furthermore, the signal fields such as the fields L-SIG, HT-SIG, VHT-SIG-C and VHT-SIG-D do not contain information by which an STA can be identified. Accordingly, the MAC (Medium Access Control) address of a data region of a currently-received signal should be checked to recognize the destination of the signal.

In order to determine whether or not the MAC address is received without an error, a CRC (Cyclic Redundancy Check) bit positioned at the last of a MAC protocol data unit (MPDU) should be checked. Therefore, a STA should receive at least one MPDU to recognize the destination of a currently-received signal. Accordingly, even when the received signal is not a signal of which the destination is set to the STA, the STA should receive at least one MPDU.

In general, a data region containing a service field includes a service field, an MPDU field, and a padding field, when the number of MPDUs is set to one, and includes a service field, a plurality of delimiter fields, a plurality of MPDU fields, and a padding field, when the number of MPDUs is set to two or more.

When the number of MPDUs is set to one or more, a 16-bit service field is transmitted at a start point of the data region. In a transmitter, all the 16 bits of the service field are set to "0", and then transmitted through a scrambler as shown in FIG. 2. In a receiver, a scramble initial value is estimated through the 16 bits of the service field, and the estimated scramble initial value is used for descramble.

In general, the scramble initial value is randomly given. For example, when it is assumed that the scramble initial value is "1011101", a scramble sequence having a length of 127 bits becomes "011011000001100110101001110011110-1101000010101011111010010100011011100001111111-000111011110010110010010000001000100110001011101".

When it is assumed that data input containing 16 "0" bits is "00000000000000000100000010000. . . ", scrambled data out in FIG. 2 becomes "0110110000011001100010011000111 . . . ". Therefore, the first 16 bits become a scramble sequence.

When it is assumed that an error does not exists in a signal received in the service field, the signal received in the service field becomes "0110110000011001" which is identical to the scramble sequence. Therefore, the signal received in the service field may be used to recognize the initial value of the scramble sequence.

SUMMARY OF THE INVENTION

An embodiment of the present invention is directed to a method for reducing power consumption, which is capable of reducing the power consumption of an STA by causing the STA to quickly decide whether or not to receive a currently-received signal through a service field existing at the front of a data region of a PPDU in a wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for reducing power consumption in a wireless communication system includes: generating a descramble initial value by using at least some bits of identification information of an STA, which is known to an AP or base station and the STA; generating a first descramble sequence by using the generated descramble initial value and comparing at least some bits of the generated first descramble sequence with at least some bits of a service field of a currently-received signal; as the comparison result, when it is determined that the destination of the currently-received signal is not set to the STA, stopping the signal reception; and as the comparison result, when it is determined that the destination of the currently-received signal is set to the STA, generating a second descramble sequence by using the descramble initial value and descrambling the currently-received signal.

In accordance with another embodiment of the present invention, a method for reducing power consumption in a wireless communication system includes: generating a plurality of descramble initial values by using at least some bits of identification information of an STA, which is known to an AP or base station and the STA; generating a plurality of first descramble sequences by using the generated descramble initial values and comparing at least some bits of the respective first descramble sequences with at least some bits of a service field of a currently-received signal; as the comparison result, when it is determined that the destination of the currently-received signal is not set to the STA, stopping the signal reception; and as the comparison result, when it is determined that the destination of the currently-received signal is set to the STA, generating a second descramble sequence by using a descramble initial value which is used for generating the first descramble sequence satisfying a condition in which at least some bits of the first descramble sequence are identical to at least some bits of the service field of the currently-received signal or the number of different bits is smaller than a decided critical bit number even though at least some bits of the first descramble sequence are different from at least some bits of the service field of the currently-received signal, among the plurality of descramble initial values, and descrambling the currently-received signal.

In accordance with another embodiment of the present invention, a method for reducing power consumption in a wireless communication system includes: generating a descramble initial value by using at least some bits of identification information of an AP or base station, which is known to the AP and an STA; generating a first descramble sequence by using the generated descramble initial value and comparing at least some bits of the generated first descramble sequence with at least some bits of a service field of a currently-received signal; as the comparison result, when it is determined that the destination of the currently-received signal is not set to the STA, stopping the signal reception; and as the comparison result, when it is determined that the destination of the currently-received signal is set to the STA, generating a second descramble sequence by using the descramble initial value and descrambling the currently-received signal.

In accordance with another embodiment of the present invention, a method for reducing power consumption in a wireless communication system includes: generating a plurality of descramble initial values by using at least some bits of identification information of an AP or base station, which is known to the AP and an STA; generating a plurality of first descramble sequences by using the generated descramble initial values and comparing at least some bits of the respective first descramble sequences with at least some bits of a service field of a currently-received signal; as the comparison result, when it is determined that the destination of the currently-received signal is not set to the STA, stopping the signal reception; and as the comparison result, when it is determined that the destination of the currently-received signal is set to the STA, generating a second descramble sequence by using a descramble initial value which is used for generating the first descramble sequence satisfying a condition in which at least some bits of the first descramble sequence are identical to at least some bits of the service field of the currently-received signal or the number of different bits is equal to or smaller than a decided critical bit number even though at least some bits of the first descramble sequence are different from at least some bits of the service field of the currently-received signal, among the plurality of descramble initial values, and descrambling the currently-received signal.

In accordance with another embodiment of the present invention, a method for reducing power consumption in a wireless communication system includes: generating an initial value having a predetermined length by using at least some bits of identification information of an STA, which is known to an AP or base station and the STA; deciding the generated initial value having a predetermined length as a scramble initial value; and generating a scramble sequence by using the decided scramble initial value, scrambling at least a service field using the generated scramble sequence, and transmitting the scrambled signal, such that a receiver of the STA determines the destination of a currently-received signal only by comparing the service field with the scramble sequence.

In accordance with another embodiment of the present invention, a method for reducing power consumption in a wireless communication system includes: generating a plurality of initial values having a predetermined length by using at least some bits of identification information of an STA, which is known to an AP or base station and the STA; deciding a plurality of scramble initial values by using the generated initial values; selecting any one of the scramble initial values; and generating a scramble sequence by using the selected scramble initial value, scrambling at least a service field using the generated scramble sequence, and transmitting the scrambled signal, such that a receiver of the STA determines the destination of a currently-received signal only by comparing the service field with the scramble sequence.

In accordance with another embodiment of the present invention, a method for reducing power consumption in a wireless communication system includes: generating an initial value having a predetermined length by using at least some bits of identification information of an AP or base station, which is known to the AP and an STA; deciding the generated initial value having a predetermined length as a scramble initial value; and generating a scramble sequence by using the decided scramble initial value, scrambling at least a service field using the generated scramble sequence, and transmitting the scrambled signal, such that a receiver of the STA determines the destination of a currently-received signal only by comparing the service field with the scramble sequence.

In accordance with another embodiment of the present invention, a method for reducing power consumption in a wireless communication system includes: generating a plurality of initial values having a predetermined length by using at least some bits of identification information of an AP or base station, which is known to the AP and an STA; deciding a plurality of scramble initial values by using the generated initial values; selecting any one of the scramble initial values; and generating a scramble sequence by using the selected scramble initial value, scrambling at least a service field using the generated scramble sequence, and transmitting the scrambled signal, such that a receiver of the STA determines the destination of a currently-received signal only by comparing the service field with the scramble sequence.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the exemplary embodiments of the present invention, when an AP transmits data to a specific STA, the AP decides a scramble initial value as a value which is previously known to the AP and the STA, without randomly generating a scramble initial value as in the related art. Accordingly, the STA may recognize a descramble initial value. Through the descramble initial value, the STA may determine whether a currently-received signal is a signal transmitted to the STA or not. Furthermore, the STA may determine whether or not a currently-received signal is a signal transmitted from the AP to which the STA belongs.

The exemplary embodiments of the present invention include a method of using information for identifying a STA by a scramble initial value and descramble initial value. Furthermore, the exemplary embodiments of the present invention include a method of using information for identifying an AP by a scramble initial value and descramble initial value.

First, the method of using information for identifying an STA by a scramble initial value and descramble initial value will be described.

An access point and an STA exchange information therebetween at the initial stage of signal transmission. For example, the exchanged information includes information by which an STA may be identified. The information by which an STA may be identified includes a MAC ID, an association ID (AID), a connection ID (CID), or a user ID (UID).

The AP decides a scramble initial value by using the previously-known information by which the STA may be identified. Hereafter, an AID applied to the WLAN will be taken as an example in the following descriptions. The AID consists of 16 bits. The AP decides a 7-bit scramble initial value by using the 16-bit AID. The method of deciding the scramble initial value by using the 16-bit AID may include a method of selecting 7 bits from the 16 bits. Another method of deciding a scramble initial value by using the 16 bit AID may include a method of mapping 16 bits to a specific value.

Figure 1A:
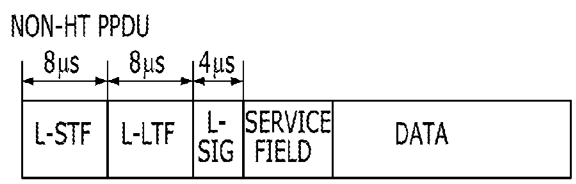
FIGS. 1A to 1C are diagram showing the PPDU format of a general WLAN system.
Figure 1B:
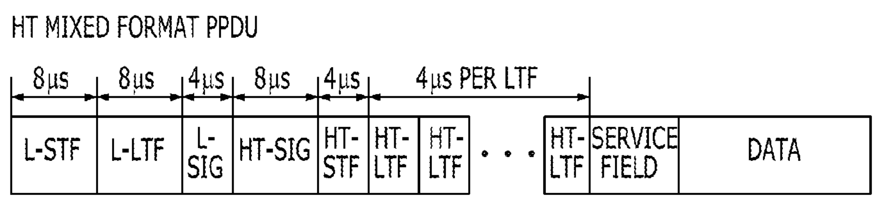
Figure 1C:
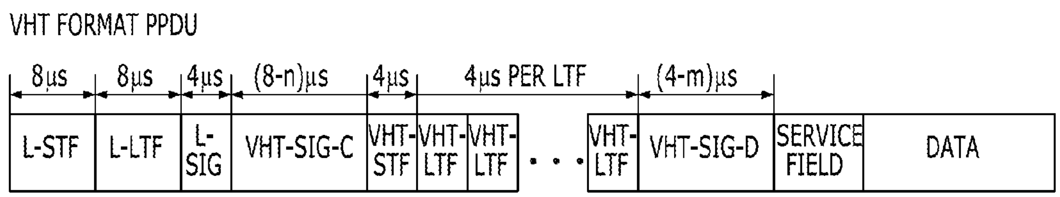
Figure 2:
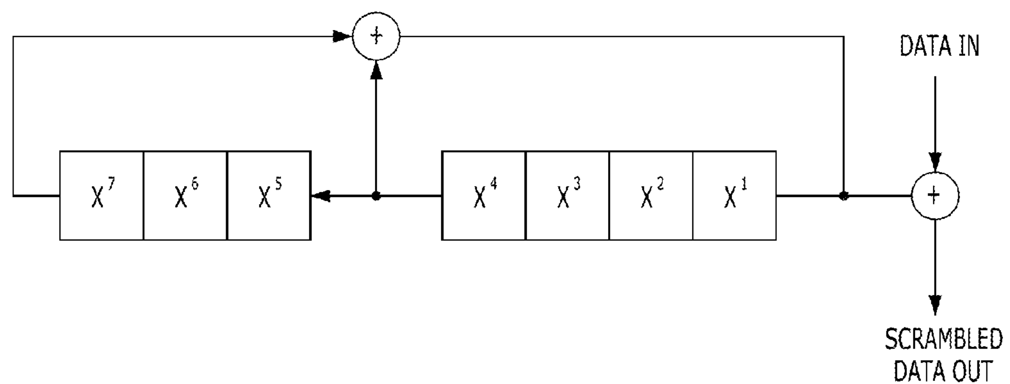
FIG. 2 is a diagram explaining a scrambler used in a general WLAN system.
Figure 3:
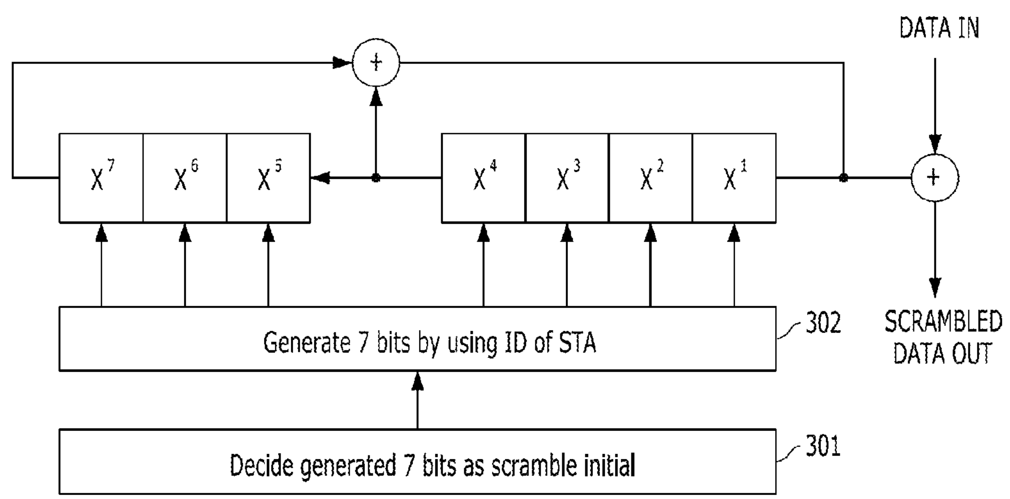
FIG. 3 is a diagram explaining a case in which the ID of an STA is used as a scramble initial value, in accordance with an embodiment of the present invention.

FIG. 3 is a diagram explaining a case in which the identification of an STA is used as a scramble initial value.

Referring to FIG. 3, when it is assumed that the AID of a k-th STA is "0110101000101110" and lower 7 bits are selected as a scramble initial value, the lower 7 bits correspond to "0101110" (301). Then, the generated 7 bits of "0101110" are decided as a scramble initial value (302).

When the scramble initial value is "010111", a scramble sequence becomes "10110110000011001101010011100111101101000010101011111010010100011011100011111111000011101111001011001001000000100010011000101110".

A service field having 16 bits of "0" and a data row to be transmitted are inputted to a scrambler through data in. The data in and the scramble sequence are XORed (Exclusive OR) into scrambled data out.

Figure 4:
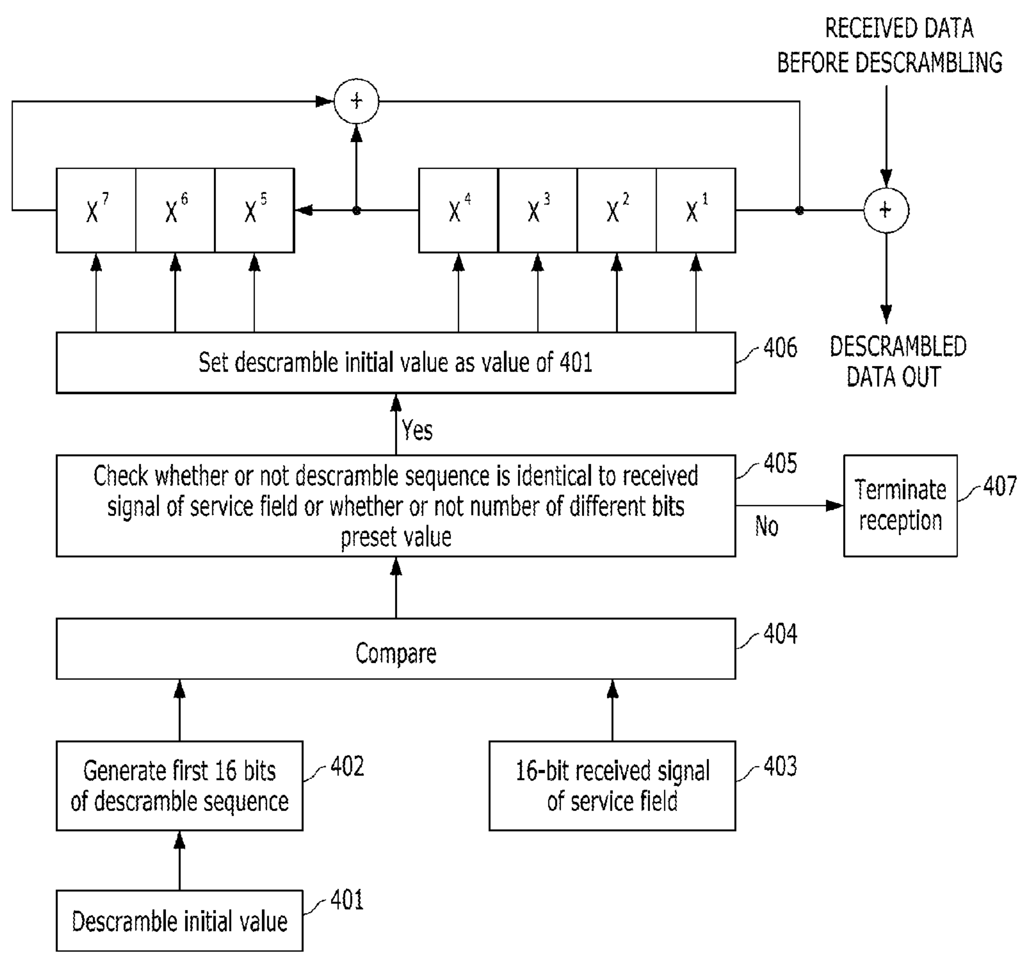
FIG. 4 is a diagram explaining a process in which a descramble initial value is used to decide whether or not to continuously receive a currently-received signal, in accordance with the embodiment of the present invention.

FIG. 4 is a diagram explaining a process of deciding whether or not to continuously receive a currently-received signal by using a descramble initial value in accordance with the embodiment of the present invention.

The STA decides lower 7 bits of its AID as a descramble initial value (401). The descramble initial value is "0101110". When the descramble initial value is decided in such a manner, the decided descramble initial value is used to generate first 16 bits of a descramble sequence (402). The first 16 bits of the descramble sequence are "1011011000001100".

Meanwhile, the STA receives a received signal of a service field (403). When it is assumed that an error does not occur on a channel, a received signal of a service field transmitted to a k-th STA by the AP is scrambled by using lower 7 bits of the AID of the STA as described above with reference to FIG. 3. Therefore, the received signal of the service field becomes "1011011000001100". When the AP transmits data not to the k-th STA but to another STA, the lower 7 bits of the AID may be changed. In this case, the scramble initial value may be changed, and the received signal of the service field becomes another value different from "1011011000001100".

The k-th STA compares the first 16 bits of the descramble sequence with the 16-bit received signal of the service field (404). When the AP transmits data to the k-th STA, the first 16 bits of the descramble sequence have the same value as the 16-bit received signal of the service field. At this time, only first 7 bits corresponding to the descramble initial value may be set to a comparison target. Alternatively, 16 bits forming the service field may be set to a comparison target. Although an error exists in some bits of the 16 bits forming the service field, a partial correlation characteristic of the scramble sequence may be used to determine that the AP transmitted data to the k-th STA. The partial correlation corresponds to a value when the entire sequence length of 127 bits is correlated with a length of 16 bits.

Meanwhile, when the AP transmitted data not to the k-th STA but to another STA, the first 16 bits of the descramble sequence may not be identical to the 16-bit received signal of the service field. For example, when the AID of an arbitrary STA is set to "0101011000101011", a scramble initial value corresponds to lower 7 bits of "0101011". In this case, a received signal of the service field becomes "1110100101000110". Therefore, the received signal of the service field differs from the first 16 bits of the descramble sequence of the k-th STA.

The first 16 bits of the descramble sequence and the 16 bits of the received signal of the service field are compared with each other (404) to check whether or not the first 16 bits of the descramble sequence and the 16-bit received signal of the service field are identical to each other or whether or not the number of different bits is smaller than a critical bit number decided by considering a partial correlation characteristic even though the first 16 bits of the descramble sequence and the 16-bit received signal of the service field are different from each other (405).

As the check result of 405, when the number of different bits is larger than the critical bit number, the STA determines that the destination of a currently-received signal is not the STA, and terminates the signal reception (407).

As the check result of 405, when the number of different bits is equal to or smaller than the critical bit number, the descramble initial value is set to the 7-bit value (401) generated by using the AID of the k-th STA (406). Then, the set descramble initial value is used to generate a descramble sequence. The received signal and the descramble sequence are XORed to generate a descrambled data output.

In accordance with the embodiment of the present invention, the STA checks whether a signal received in the service field is identical to a descramble sequence generated from a descramble initial value or not, and determines whether a currently-received signal is a signal transmitted to the STA or not. Then, when the currently-received signal is a signal transmitted to the STA, the STA demodulates the data region, and when the currently-received signal is not a signal transmitted to the STA, the STA stops the operation of a receiver to save power.

Meanwhile, the embodiments of the present invention include a method of deciding a scramble initial value by setting an arbitrary offset according to the number of retransmissions, in order to relieve a problem of a peak to average ratio when a data packet is to be retransmitted because of an error occurring in the data packet. A method of setting an offset may include a method of differently deciding 7 bits of a 16-bit AID during each retransmission. Alternatively, the method of setting an offset may include a method of adding a specific value to 7 bits selected from a 16-bit AID or shifting the 7 bits.

The receiver of the STA may generate a descramble sequence according to the decided offset method and number, compare the descramble sequence with the received signal of the service field, and check whether the currently-received signal is a signal transmitted to the STA or not.

Figure 5:
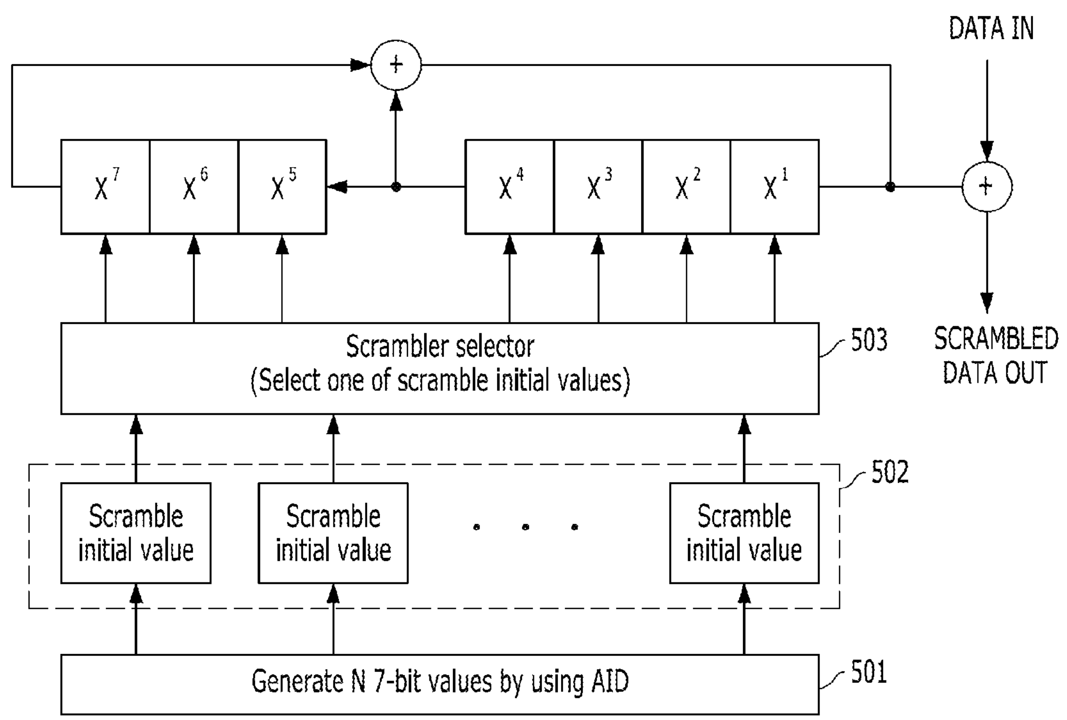
FIG. 5 is a diagram explaining a process in which one of a plurality of scramble initial values is selected to perform scrambling, in accordance with the embodiment of the present invention.

FIG. 5 is a diagram explaining a method of selecting one from a plurality of scramble initial values and scrambling the selected scramble initial value by using an AID, when N scramble initial values are provided.

The 16-bit AID of the k-th STA is used to generate 7 bits for a scramble initial value. That is, N 7-bit values are generated through a method of changing a position where 7 bits are selected from the 16 bits of the AID or a method of shifting a position where 7 bits are selected (501). Alternatively, N 7-bit values may be generated through a method of selecting 7 bits from the 16 bits of the AID and shifting the selected 7 bits or adding a specific value to selected some bits (501).

Then, N scramble initial values are decided as the generated N 7-bit values (502). The number of retransmissions is considered to select one from the N scramble initial values (503). The selected scramble initial value is used to generate a scramble sequence. A service field having 16 bits of "0" and a data row to be transmitted are inputted to a scrambler through data in. Then, the data in and the scramble sequence are XORed to generate scrambled data out.

Figure 6:
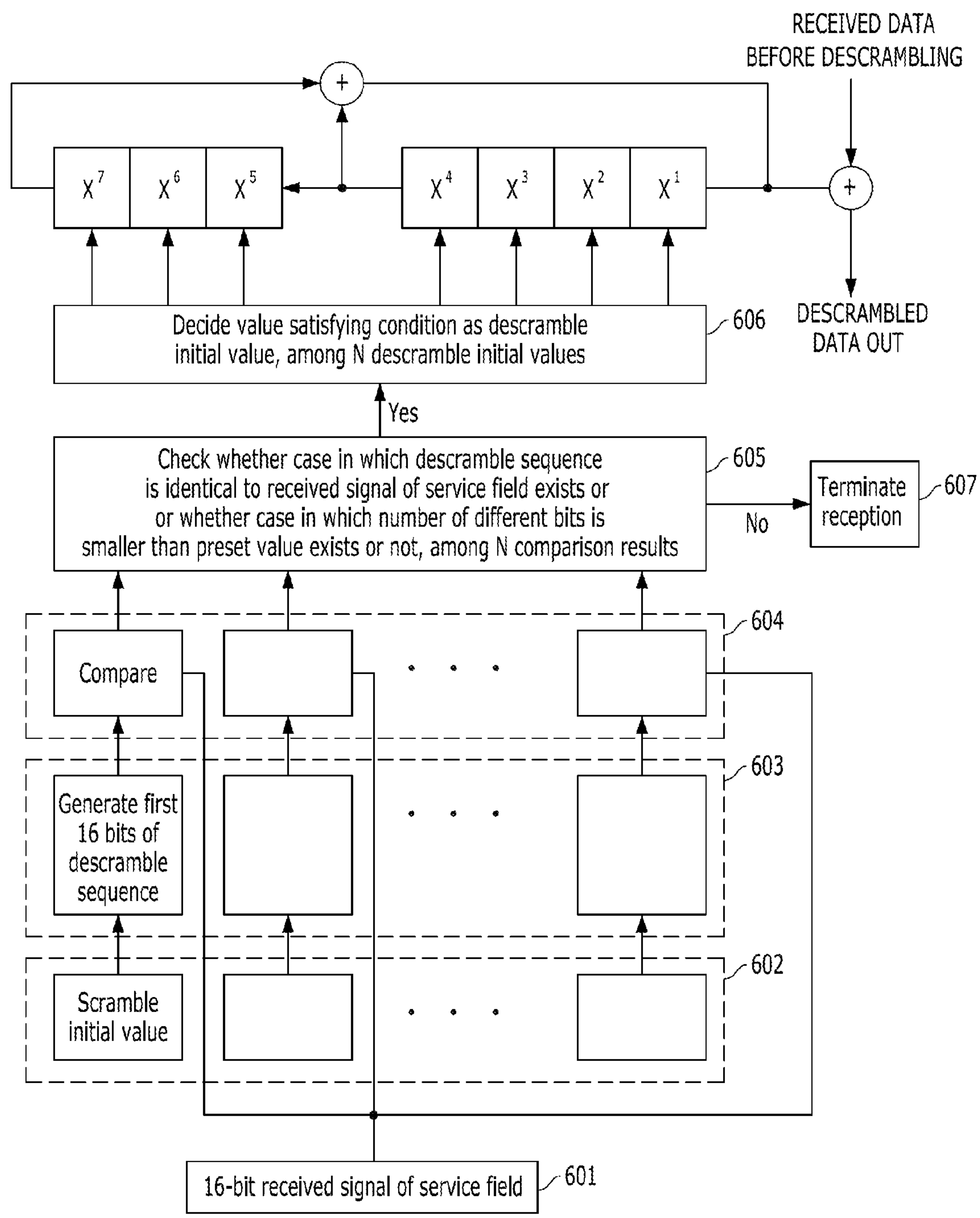
FIG. 6 is a diagram explaining a process in which a plurality of descramble initial values are used to decide whether or not to continuously receive a currently-received signal, in accordance with the embodiment of the present invention.

FIG. 6 is a diagram explaining a method of selecting a descramble initial value from a plurality of descramble initial values and descrambling the selected descramble initial value. The method of FIG. 6 is a descrambling process corresponding to the method of FIG. 5.

The STA receives a 16-bit signal of a service field (601). Furthermore, the STA generates N descramble initial values according to a method decided between the AP and the STA, by using its AID (602). The STA generates first 16 bits of N descramble initial sequences, respectively, by using the N descramble initial values (603).

Then, the first 16 bits of the respective N descramble sequences are compared with the 16-bit received signal of the service field (604). Among the comparison results between the first 16 bits of the respective N descramble sequences and the 16-bit received signal of the service field, it is checked whether a case in which the first 16 bits of a descramble sequence are identical to the 16-bit received signal of the service field exist or not or whether a case in which the number of different bits is smaller than a critical bit number decided by a partial correlation characteristic exists or not (605).

As the comparison result between the first 16 bits of the respective N descramble sequences and the 16 bits of the received signal of the service field, when the first 16 bits of the respective N descramble sequences are not identical to the 16 bits of the received signal of the service field or the number of different bits is larger than the decided critical bit number, the STA determines that the destination of the currently-received signal was not set to the STA, and terminates the reception.

As the comparison result between the first 16 bits of the respective N descramble sequences and the 16 bits of the received signal of the service field, when the first 16 bits of the respective N descramble sequences are identical to the 16 bits of the received signal of the service field or the number of different bits is equal to or smaller than the decided critical bit number, the STA determines that the destination of the currently-received signal was set to the STA. Accordingly, a descramble initial value is decided by a value satisfying a condition among the N descramble initial values (606). The value satisfying a condition indicates a value which satisfies a condition in which the value is identical to the 16 bits of the received signal of the service field or a condition where the number of different bits is smaller than the decided bit number even though the value is different from the 16 bits of the received signal of the service field. Then, the decided descramble initial value is used to generate a descramble sequence. The received signal and the descramble sequence are XORed to generate descrambled data out.

Figure 7:
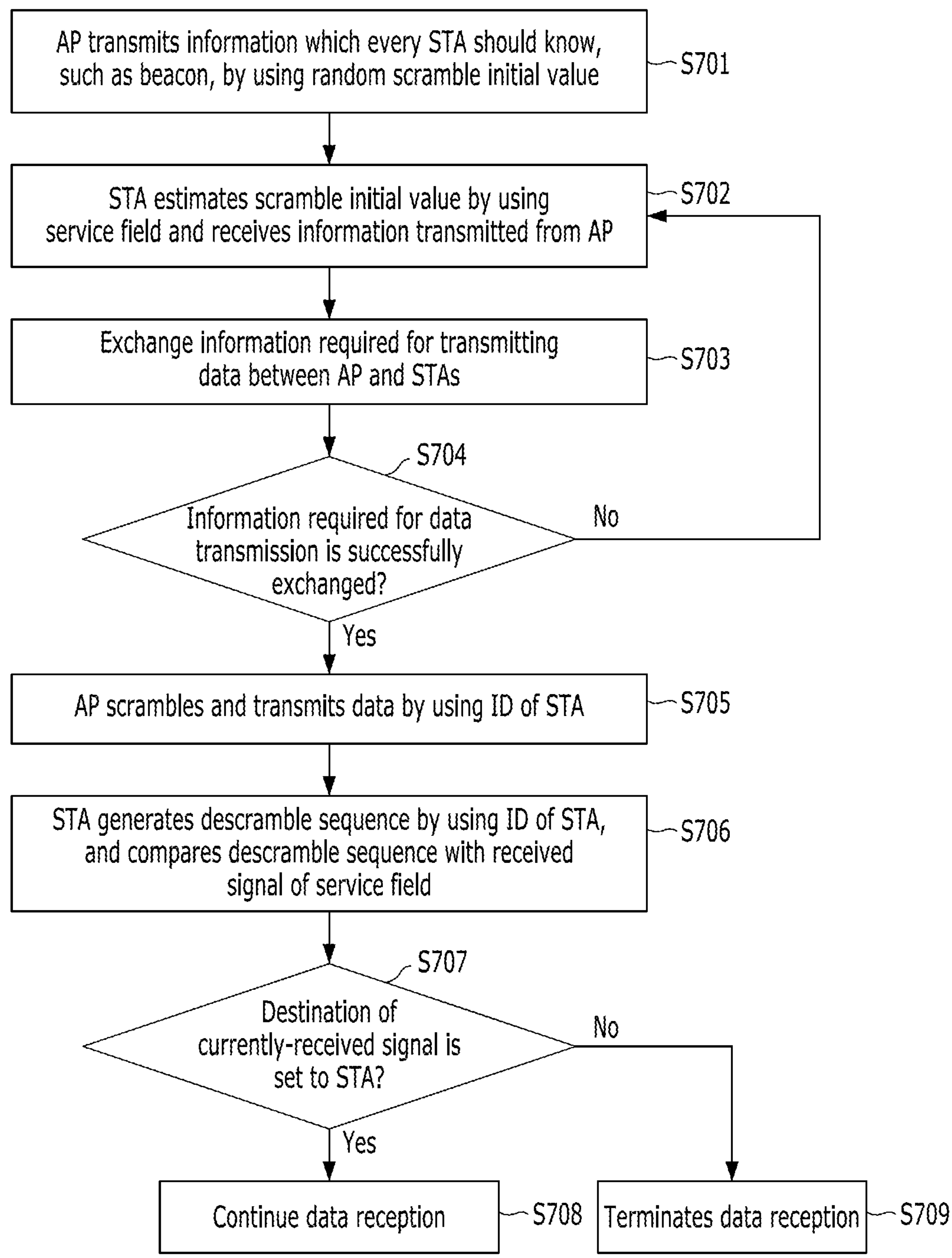
FIG. 7 is a flow chart explaining a method for reducing power consumption by using the ID of an STA, in accordance with the embodiment of the present invention.

FIG. 7 is a flow chart explaining the above-described embodiment of the present invention.

The AP transmits information which every STA should know, by using a random scramble initial value or an initially-set initial value at step S701. Such information is transmitted through a control signal, a beacon signal, or a broadcasting signal.

Since the STA cannot know the scramble initial value transmitted by the AP at the initial stage, the STA estimates a scramble initial value by using a received service field, and set a descramble initial value from the estimated scramble initial value to descramble a received signal at step S702.

Then, the AP and the STA exchange information required for transmitting data for the respective STAs at step S703. When the information exchange is successfully performed, transmission of data for the STA is started at step S704. However, when the information exchange fails, the process returns to the step S702 in which the STA estimates a scramble initial value to receive a signal.

After the information exchange is successfully performed, the AP generates a scramble sequence as the scramble initial value generated by using an ID (for example, AID) of a specific STA and then scrambles data to transmit to the corresponding STA at step S705.

The STA generates a descramble sequence by using the descramble initial value generated by using its ID, and compares the generated descramble sequence with the received signal of the service field at step S706. Then, the STA determines whether or not to continuously receive the currently-received signal, based on the comparison result between the descramble sequence and the received signal of the service field, at step S707. Here, the STA determines that the currently-received signal is a signal of which the destination was set to the STA, when the first 16 bits of the descramble sequence are identical to 16 bits of the received signal of the service field or the number of different bits is smaller than a critical bit number decided by considering a partial correlation characteristic.

When it is determined at the step S707 that the currently-received signal is a signal of which the destination was set to the STA, the STA continuously receives data at step S708. When it is determined that the currently-received signal is not a signal of which the destination was set to the STA, the STA terminates the data reception at step S709.

Now, a case in which information for identifying an AP by a scramble initial value and a descramble initial value is used will be described.

Figure 8:
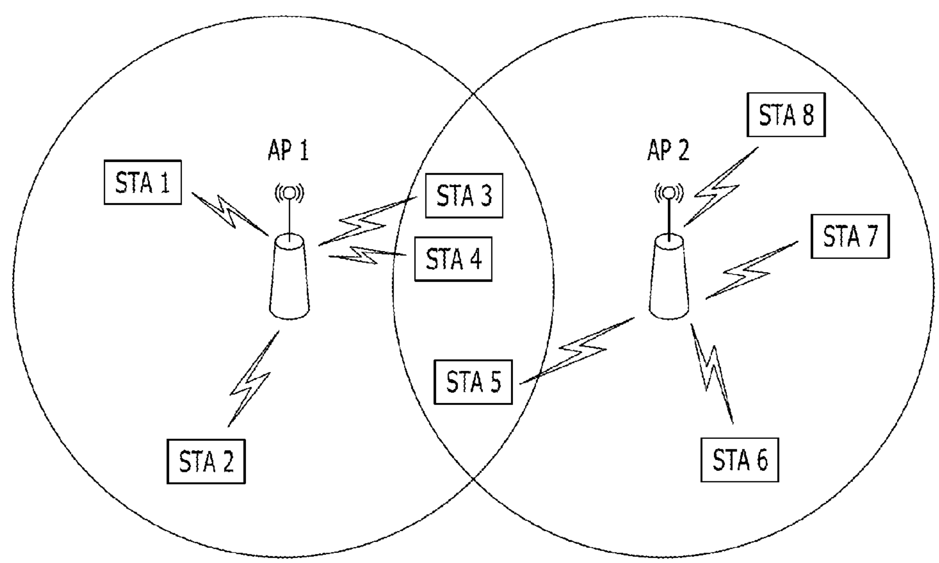
FIG. 8 is a diagram explaining a general OBSS.

FIG. 8 is a diagram explaining an overlapping BSS (OBSS) when all or a part of frequency used by a general AP AP1 and AP AP2 is overlapped.

It is assumed that a part of frequency used by the AP AP1 and the AP AP2 is overlapped, STAs STA1 to STA4 among eight STAs are connected to the AP AP1, and STAs STA1 to STA4 are connected to the AP AP2. The STAs STA5 to STA8 connected to the AP AP2 may receive a signal transmitted by the AP AP1, because the AP AP1 and the AP AP2 use the same frequency. In particular, since the received signal strength of the signal transmitted from the AP AP1 is high, the STA STA5 senses the signal transmitted from the AP AP1 and demodulates the sensed signal. Therefore, the STAs connected to the AP2 receive a signal which does not need to be received, and thus power consumption inevitably increases. In the embodiment of the present invention, a scramble initial value is decided as a value by which an AP can be identified, in order to reduce the power consumption. The value by which an AP can be identified may include a basic service set ID (BSSID), a BSID, or an access point ID (APID).

Figure 9:
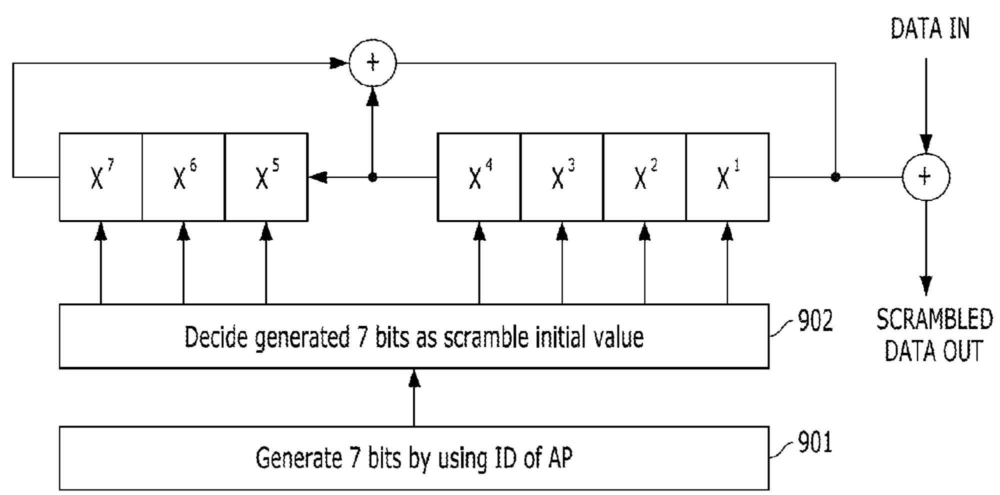
FIG. 9 is a diagram explaining a case in which the ID of an AP is used as a scramble initial value, in accordance with the embodiment of the present invention.

FIG. 9 is a diagram explaining a case in which some bits of a BSSID by which an AP can be identified are used to perform scrambling. In this case, lower 7 bits of 48 bits of the BSSID are used.

First, a 7-bit value is generated by using a value by which an AP can be identified (901), and the generated 7-bit value is decided as a scramble initial value (902). When lower 7 bits of a BSSID are used as the scramble initial value, it may be assumed that lower 7 bits of the BSSID of the AP AP1 are "1010010" and lower 7 bits of the BSSID of the AP AP2 are "0101011". In this case, the scramble initial value of the AP AP1 becomes "1010010", and the scramble initial value of the AP AP2 becomes "0101011". A signal transmitted through a signal field from the AP AP1 becomes "100011011100011", and a signal transmitted through a service field from the AP AP2 becomes "111010010100011".

The APs AP1 and AP2 input a service field having 16 bits of "0" and a data row to be transmitted to a scrambler through data in. The APs AP1 and AP2 perform an XOR operation on the data in and a scramble sequence and transmit the scrambled data out.

Now, a process of descrambling a signal which is scrambled and transmitted by using the ID of an AP will be described as follows. A reception method of an STA may be performed in the same manner as described with reference to FIG. 4. However, a descramble sequence may be decided from a value by which an STA is identified or a value by which an AP is identified.

The case of the STA STA5 in FIG. 8 may be taken as an example to describe the reception method of the STA. The STA STA5 compares first 16 bits of a descramble sequence, which is generated from a descramble initial value generated from the BSSID of the AP AP2 to which the STA STA5 belongs, with 16 bits of a received service field. When the first 16 bits of the descramble sequence are identical to the 16 bits of the received service field, the STA STA5 determines that a currently-received signal is a signal transmitted from the AP AP2 to which the STA STA5 belongs. When the first 16 bits of the descramble sequence are different from the 16 bits of the received service field, the STA STA5 determines that the currently-received signal is not a signal transmitted from the AP AP2 to which the STA STA5 belongs, and terminate the reception. That is, when it is assumed that the AP AP1 transmits the signal, the received signal of the service field becomes "100011011100011". Since the descramble sequences of the STAs STA1 to STA4 connected to the AP AP1 are identical to the received signal of the service field, the STAs STA1 to STA4 continuously perform demodulation. The descramble sequences of the STAs STA5 to STA8 connected to the AP AP2 become "1110100101000110", and differ from the received signal of the service field. Therefore, the STAs STA5 to STA8 terminate the reception.

Meanwhile, a value by which an AP can be identified may be used to generate a plurality of scramble initial values, and one of the scramble initial values may be selected to perform scrambling. The case in which the ID of the AP is used to generate the plurality of scramble initial values and to perform scrambling corresponds to the same process as the above-described case of FIG. 5. In this case, the descrambling process is performed in the same manner as described with reference to FIG. 6. That is, when the AID of the STA in FIGS. 5 and 6 is changed into a value by which an AP can be identified (for example, BSSID), the descrambling process may be performed in the same manner. Therefore, the detailed descriptions of the process in which the ID of the AP is used to generate and scramble the plurality of scramble initial values and the plurality of descramble initial values are generated to perform descrambling will be omitted herein.

Figure 10:
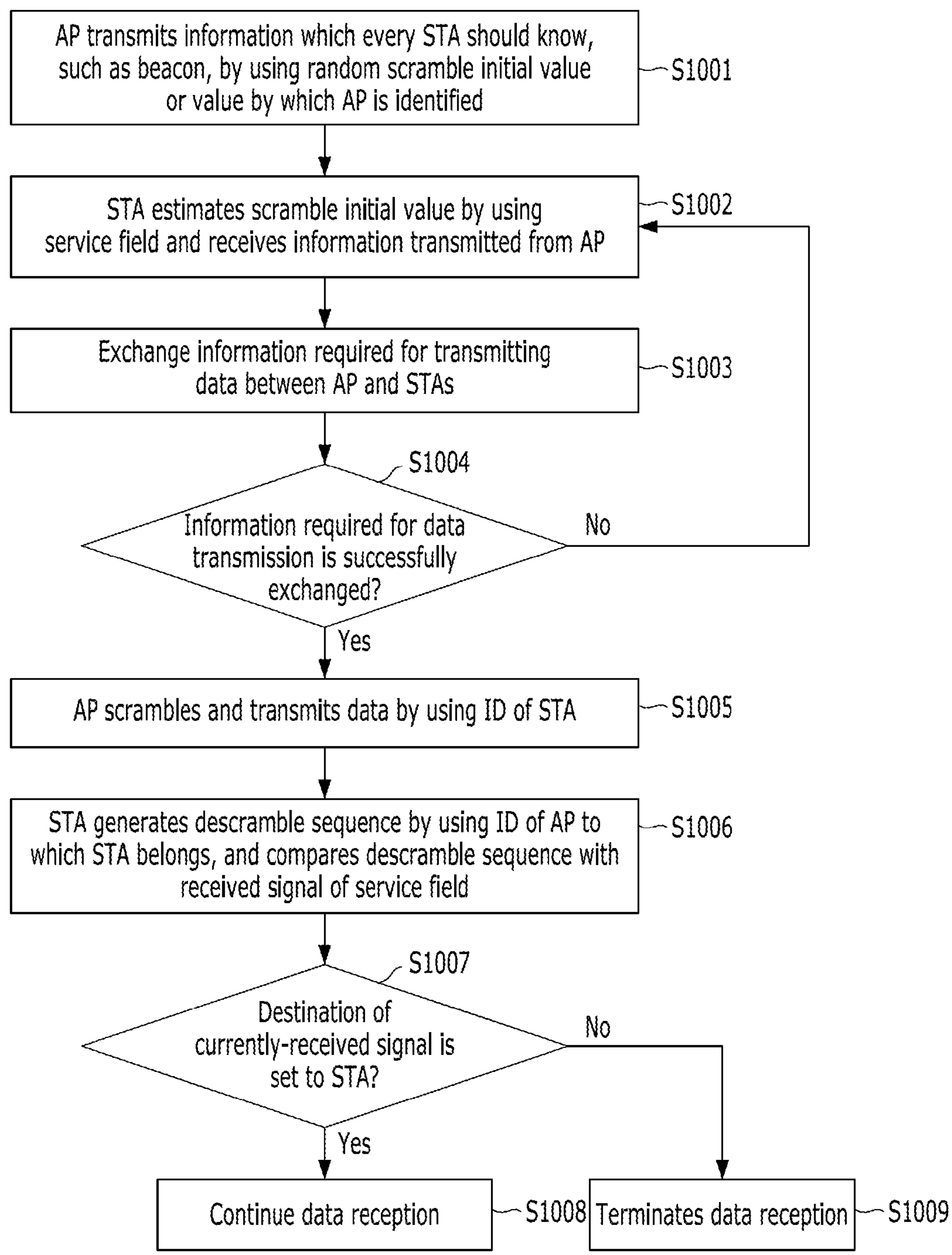
FIG. 10 is a diagram explaining a method for reducing power consumption by using the ID of the AP.

FIG. 10 is a flow chart explaining a method for reducing power consumption by using a value by which an AP can be identified, in accordance with another embodiment of the present invention.

An AP transmits information which every STA should know, by using an arbitrary initial value set for a scrambler or an initial value by which the AP can be identified, at step S1001. Such information may be transmitted through a control signal, a beacon signal, or a broadcasting signal. The STA cannot know the scramble initial value transmitted by the AP at the initial stage. Therefore, the STA estimates a scramble initial value by using a received service field, and decides a descramble initial value from the estimated scramble initial value to descramble a received signal, at step S1002.

Then, the AP and the STA exchange information required for transmitting data for the respective STAsat step S1003. When the information exchange is successfully performed, transmission of data for the STA is started at step S1004. However, when the information exchange fails, the process returns to the step S1002 in which the STA estimates a scramble initial value and receives a signal.

After the information exchange is successfully performed, the AP generates a scramble sequence from the scramble initial value generated by using its ID (for example, BSSID), and scrambles data to transmit to a specific STA, at step S1005.

The STA generates a descramble sequence by using the descramble initial value generated by using the ID of the AP to which the STA belongs, and compares the generated descramble sequence with the received signal of the service field, at step S1006. Then, the STA determines whether or not to continuously receive the currently-received signal, based on the comparison result between the descramble sequence and the received signal of the service field, at step S1007. Here, when the first 16 bits of the descramble sequence are identical to the 16 bits of the received signal of the service field or the number of different bits is smaller than a critical bit number decided by considering a partial correlation characteristic, the STA determines that the currently-received signal is a signal of which the destination was set to the STA.

When it is determined at the step S1007 that the currently-received signal is a signal of which the destination was set to the STA, the STA continues the data reception at step S1008. When it is determined that the received signal is not a signal of which the destination was set to the STA, the STA terminates the data reception at step S1009.

In the above-described embodiments of the present invention, the scrambler generating a sequence having a length of 127 bits has been taken as an example. However, the embodiments of the present invention may be applied to another scrambler having a different length (for example, $2^{n-1}$ (n=4, 5, 6, . . . )=31, 63, 255, 511, 1023, 2047, . . . ) . Furthermore, in the embodiments of the present invention, the service field having 16 bits has been taken as an example. However, the embodiments of the present invention may also be applied to another service field having a different length.

The embodiments of the present invention can be written as computer programs and can be implemented in general-use digital computers that execute the programs using a computer readable recording medium including CD-ROM, RAM, ROM, a floppy disk, a hard disk, a magneto-optical disk or the like. Such a process may be easily performed by those skilled in the art. Therefore, the detailed descriptions thereof are omitted.

In accordance with the embodiments of the present invention, when the scramble initial value is generated and used by using the ID of the STA which is known the base point (or AP) and the STA, the STA may recognize that a currently-received signal is a signal transmitted to the STA, through the service field. Accordingly, the STA may quickly decide whether or not to continuously receive the currently-received signal, which makes it possible to reduce the power consumption.

Furthermore, when the scramble initial value is generated and used by using the ID of the AP, the STA may recognize that a currently-received signal is a signal transmitted from the AP connected to the STA, through the service field. Accordingly, the STA may quickly decide whether or not to continuously receive the currently-received signal, which makes it possible to reduce the power consumption.

While the present invention has been described with respect to the specific embodiments, it will be apparent to those skilled in the art that various changes and modifications may be made without departing from the spirit and scope of the invention as defined in the following claims.

What is claimed is:

1. A method for reducing power consumption in a wireless communication system, comprising:

generating, by a destination point, a descramble initial value by using at least some bits of identification information of a station (STA), which is known to an access point (AP) or base station and the STA;

generating, by the destination point, a first descramble sequence by using the generated descramble initial value;

receiving, by the destination point, a signal having a service field;

comparing at least some bits of the generated first descramble sequence with at least some bits of the service field of the signal;

stopping the signal reception when the destination point determines that it is not the destination of the signal; and generating a second descramble sequence using the descramble initial value and descrambling the signal using the second descramble sequence when the destination point determines that it is the destination for the signal.

2. The method of claim 1, wherein the destination point determines that it is the destination of the signal is set to the STA, when at least some bits of the first descramble sequence are identical to at least some bits of the service field of the signal or the number of different bits is equal to or smaller than a preset critical bit number.

3. The method of claim 2, wherein the at least some bits of the first descramble sequence and the at least some bits of the service field of the signal are predetermined.

4. A method for reducing power consumption in a wireless communication system, comprising:

generating, by a destination point, a plurality of descramble initial values by using at least some bits of identification information of an STA, which is known to an AP or base station and the STA;

generating, by the destination point, a plurality of first descramble sequences by using the generated descramble initial values;

receiving, by the destination point, a signal having a service field;

comparing at least some bits of the respective first descramble sequences with at least some bits of the service field of the signal;

stopping the signal reception when the destination point determines that it is not the destination of the signal; and generating a second descramble sequence using a descramble initial value which is used for generating a first descramble sequence satisfying a condition in which at least some bits of the first descramble sequence are identical to at least some bits of the service field of the signal, or the number of different bits is smaller than a decided critical bit number to descramble the signal.

5. The method of claim 4, further comprising comparing a first predetermined bits of the plurality of first descramble sequences with a predetermined bits of the service field of the signal, and determining that the destination point is the destination when the first predetermined bits of any one the plurality of first descramble sequences are identical to the predetermined bits of the service field of the signal, or the number of different bits is equal to or smaller than a preset critical bit number.

6. A method for reducing power consumption in a wireless communication system, comprising:

generating, by a destination point, a descramble initial value by using at least some bits of identification information of an AP or base station, which is known to the AP and an STA;

generating, by the destination point, a first descramble sequence by using the generated descramble initial value;

receiving, by the destination point, a signal having a service field;

comparing at least some bits of the generated first descramble sequence with at least some bits of the service field of the currently-received signal;

stopping the signal reception when the destination point determines that it is not the destination of the signal; and generating a second descramble sequence using the descramble initial value and descrambling the signal using the second descramble sequence when the destination point determines that it is the destination for the signal.

7. The method of claim 6, wherein the destination point determines that it is the destination of the signal is set to the STA, when at least some bits of the first descramble sequence are identical to at least some bits of the service field of the signal or the number of different bits is equal to smaller than a preset critical bit.

8. The method of claim 7, wherein the at least some bits of the first descramble sequence and the at least some bits of the service field of the signal are predetermined.

9. A method for reducing power consumption in a wireless communication system, comprising:

generating, by a destination point, a plurality of descramble initial values by using at least some bits of identification information of an AP or base station, which is known to the AP and an STA;

generating, by the destination point, a plurality of first descramble sequences by using the generated descramble initial values;

receiving, by the destination point, a signal having a service field;

comparing at least some bits of the respective first descramble sequences with at least some bits of the service field of the currently-received signal;

stopping the signal reception when the destination point determines that it is not the destination of the signal; and generating a second descramble sequence using a descramble initial value which is used for generating a first descramble sequence satisfying a condition in which at least some bits of the first descramble sequence are identical to at least some bits of the service field of the signal, or the number of different bits is equal to or smaller than a decided critical bit number to descramble the signal.

10. The method of claim 9, further comprising comparing a first predetermined bits of the plurality of first descramble sequences with a predetermined bits of the service field of the signal, and determining that the destination point is the destination when the first predetermined bits of any one the plurality of first descramble sequences are identical to the predetermined bits of the service field of the signal, or the number of different bits is equal to or smaller than a preset critical bit number.

11. A method for reducing power consumption in a wireless communication system, comprising:

generating, by an origination point, an initial value having a predetermined length by using at least some bits of identification information of an STA, which is known to an AP or base station and the STA;

deciding, by the origination point, the generated initial value having a predetermined length as a scramble initial value;

generating, by the origination point, a scramble sequence by using the decided scramble initial value;

scrambling, by the origination point, at least a service field and the generated scramble sequence as input data to produce a scrambled service field;

transmitting the scrambled service field to a destination;

comparing the transmitted scrambled service field with a descramble sequence generated by the destination; and deciding by the destination whether to terminate signal reception.

12. The method of claim 11, wherein the some bits of the identification information of the AP are used to generate a 7-bit initial value.

13. A method for reducing power consumption in a wireless communication system, comprising:

generating, by an origination point, a plurality of initial values having a predetermined length by using at least some bits of identification information of an STA, which is known to an AP or base station and the STA;

deciding, by the origination point, a plurality of scramble initial values by using the generated initial values;

selecting, by the origination point, any one of the scramble initial values; and generating, by the origination point, a scramble sequence by using the selected scramble initial value;

scrambling, by the origination point, at least a service field and the generated scramble sequence as input data to produce a scrambled service field;

transmitting the scrambled service field to a destination;

comparing the transmitted scrambled service field with a descramble sequence generated by the destination; and deciding by the destination whether to terminate signal reception.

14. A method for reducing power consumption in a wireless communication system, comprising:

generating, by an origination point, an initial value having a predetermined length by using at least some bits of identification information of an AP or base station, which is known to the AP and an STA;

deciding, by the origination point, the generated initial value having a predetermined length as a scramble initial value; and generating, by the origination point, a scramble sequence by using the decided scramble initial value;

scrambling, by the origination point, at least a service field and the generated scramble sequence as input data to produce a scrambled service field;

transmitting the scrambled service field to a destination;

comparing the transmitted scrambled service field with a descramble sequence generated by the destination; and deciding by the destination whether to terminate signal reception.

15. The method of claim 14, wherein the some bits of the identification information of the AP are used to generate a 7-bit initial value.

16. A method for reducing power consumption in a wireless communication system, comprising:

generating, by an origination point, a plurality of initial values having a predetermined length by using at least some bits of identification information of an AP or base station, which is known to the AP and an STA;

deciding, by the origination point, a plurality of scramble initial values by using the generated initial values;

selecting, by the origination point, any one of the scramble initial values; and generating, by the origination point, a scramble sequence by using the selected scramble initial value;

scrambling, by the origination point, at least a service field and the generated scramble sequence as input data to produce a scrambled service field;

transmitting the scrambled service field to a destination;

comparing the transmitted scrambled service field with a descramble sequence generated by the destination; and deciding by the destination whether to terminate signal reception.

17. The method of claim 11, further comprising terminating signal reception when the transmitted scrambled service field and the descramble sequence are not identical, or the number of different bits between the transmitted scrambled service field and the descramble sequence are not identical is greater than a critical bit number decided by considering a partial correlation characteristic.

18. The method of claim 11, wherein the identification information of the STA is selected from the group consisting of a MAC ID, and association ID, a connection ID and a user ID.

19. The method of claim 11, further comprising generating, by the destination, a descramble initial value by using at least some bits of identification information of the station (STA), which is known to an access point (AP) or base station and the STA; and generating, by the destination, a first descramble sequence using the generated descramble initial value.

20. The method of claim 19, further comprising terminating signal reception when the transmitted scrambled service field and the descramble sequence are not identical, or the number of different bits between the transmitted scrambled service field and the descramble sequence are not identical is greater than a critical bit number decided by considering a partial correlation characteristic.

* * * * *